United States Patent
Huhtala et al.

(10) Patent No.: US 9,766,698 B2
(45) Date of Patent: Sep. 19, 2017

(54) METHODS AND APPARATUSES FOR DEFINING THE ACTIVE CHANNEL IN A STEREOSCOPIC VIEW BY USING EYE TRACKING

(75) Inventors: Jussi Huhtala, Oulu (FI); Katja Kytökorpi, Oulu (FI); Mikko Paldanius, Oulu (FI); Sarjanoja Ari-Heikki, Oulu (FI); Minna Karukka, Oulu (FI)

(73) Assignee: Nokia Technologies Oy, Espoo (FI)

( * ) Notice: Subject to any disclaimer, the term of this patent is extended or adjusted under 35 U.S.C. 154(b) by 959 days.

(21) Appl. No.: 13/101,297

(22) Filed: May 5, 2011

(65) Prior Publication Data

US 2012/0280899 A1 Nov. 8, 2012

(51) Int. Cl.
| | | |
|---|---|---|
| *G06F 3/038* | (2013.01) | |
| *G06F 3/01* | (2006.01) | |
| *H04N 13/04* | (2006.01) | |
| *G06F 3/0484* | (2013.01) | |
| *G02B 27/01* | (2006.01) | |

(52) U.S. Cl.
CPC .......... *G06F 3/013* (2013.01); *H04N 13/0484* (2013.01); *G02B 27/0172* (2013.01); *G06F 3/04842* (2013.01)

(58) Field of Classification Search
CPC .... G06F 3/011; G06F 3/017; G06F 17/30247; G06F 17/30265; G06F 3/012; G06F 3/013; G02B 27/017; G02B 27/2214; G02B 27/225; H04N 13/0022
USPC .......................................................... 345/156
See application file for complete search history.

(56) References Cited

U.S. PATENT DOCUMENTS

| | | |
|---|---|---|
| 5,825,340 A | 10/1998 | Torizuka et al. |
| 6,353,436 B1 * | 3/2002 | Reichlen ................. 345/427 |
| 2004/0207635 A1 * | 10/2004 | Miller et al. ............. 345/617 |
| 2005/0264558 A1 | 12/2005 | Vesely et al. |
| 2007/0030264 A1 * | 2/2007 | Song et al. .............. 345/419 |
| 2007/0171276 A1 * | 7/2007 | Kim et al. ................. 348/51 |
| 2008/0266257 A1 * | 10/2008 | Chiang ............... G06F 1/1626 345/163 |
| 2010/0125816 A1 * | 5/2010 | Bezos ...................... 715/863 |
| 2010/0164952 A1 * | 7/2010 | Roderick ................. 345/419 |
| 2010/0253766 A1 | 10/2010 | Mann et al. |
| 2010/0302350 A1 | 12/2010 | Shafer et al. |
| 2011/0018882 A1 | 1/2011 | Seong et al. |
| 2011/0032346 A1 | 2/2011 | Kleinberger et al. |
| 2011/0074939 A1 * | 3/2011 | Ito et al. ................... 348/58 |

* cited by examiner

*Primary Examiner* — Kent Chang
*Assistant Examiner* — Sujit Shah
(74) *Attorney, Agent, or Firm* — Alston & Bird LLP (57) ABSTRACT

Methods and apparatuses are provided for facilitating interaction with a three-dimensional user interface. A method may include receiving an indication of an eye movement input to an imaging sensor. The method may further include determining, by a processor, a relation of the eye movement to at least one of a displayed element of a three-dimensional user interface. The method may additionally include causing, based at least in part on the determined relation, a selection of at least one of a displayed element of the three-dimensional user image. The method may also include causing a modification of a displayed element of the at least one selected displayed element of the three-dimensional image. Corresponding apparatuses are also provided.

15 Claims, 4 Drawing Sheets

METHODS AND APPARATUSES FOR DEFINING THE ACTIVE CHANNEL IN A STEREOSCOPIC VIEW BY USING EYE TRACKING

TECHNOLOGICAL FIELD

Example embodiments of the present invention relate generally to user interface technology and, more particularly, relate to methods and apparatuses for defining the active channel in a stereoscopic view by using eye tracking.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

The evolution in the power and affordability of mobile computing devices has included the release of computing devices including enhanced user interface technologies, such as enhanced interactive displays. For example, three-dimensional display for usage on mobile devices and computers are in development. Some three-dimensional displays provide an autosteroscopic three-dimensional effect, which allows a user to perceive a three-dimensional image without using three-dimensional glasses. However, while such three-dimensional displays may provide a "wow" factor to users and have been used for some gaming and movie applications, to date there has been a lack of development of user interface technology leveraging user interactions with a three-dimensional display.

BRIEF SUMMARY

Methods, apparatuses, and computer program products are herein provided for defining the active channel in a stereoscopic view by using eye tracking Methods, apparatuses, and computer program products in accordance with various embodiments may provide several advantages to application developers, computing devices, and computing device users. In this regard, such example embodiments may enable a user to define an active channel in a stereoscopic view of a three-dimensional image displayed by a touch display by making an eye movement tracked by an imaging sensor. Accordingly, a user may intuitively interact with a three-dimensional user interface by manipulating the three-dimensional user interface in three-dimensional space using a facial gesture, such as an eye movement. Further, application developers and other developers of graphical user interfaces may develop three-dimensional graphical user interfaces taking advantage of such facial gestures.

Some example embodiments further provide an imaging sensor, such as a camera, with which a user may interact through the use of facial gestures, such as eye movements. In this regard, the imaging sensor of some example embodiments may comprise a video camera, which a user may engage by conducting various eye movements. Accordingly, a user may be able to intuitively select either a left image, a right image, or both images of a stereoscopic three-dimensional image, and/or the like.

In a first example embodiment, a method is provided, which comprises receiving an indication of an eye movement to an imaging sensor. The method of this example embodiment further comprises determining, based at least in part on the received indication, a relation of the eye movement to at least one of a displayed element of a three-dimensional user interface. The method of this example embodiment additionally comprises causing, based at least in part on the determined relation, a selection of at least one of a displayed element of the three-dimensional user interface. The method of this example embodiment also comprises causing a modification of the at least one selected displayed element of the three-dimensional user interface.

In another example embodiment, an apparatus comprising at least one processor and at least one memory storing computer program code is provided. The at least one memory and stored computer program code are configured, with the at least one processor, to cause the apparatus of this example embodiment to at least receive an indication of an eye movement to an imaging sensor. The at least one memory and stored computer program code are configured, with the at least one processor, to further cause the apparatus of this example embodiment to determine a relation of the eye movement to at least one of a displayed element of a three-dimensional display. The at least one memory and stored computer program code are configured, with the at least one processor, to additionally cause the apparatus of this example embodiment to cause, based at least in part on the determined relation, a selection of at least one of a displayed element of the three-dimensional display. The at least one memory and stored computer program code are configured, with the at least one processor, to also cause the apparatus of this example embodiment to cause a modification of the at least one selected displayed element of the three-dimensional display.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method comprising receiving an indication of an indication of an eye movement to an imaging sensor. The method of this example embodiment further comprises determining a relation of the eye movement to at least one of a displayed element of a three-dimensional user interface. The method of this example embodiment additionally comprises causing, based at least in part on the determined relation, a selection of at least one of a displayed element of the three-dimensional user interface. The method of this example embodiment also comprises causing a modification of the at least one selected displayed element of the three dimensional display.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
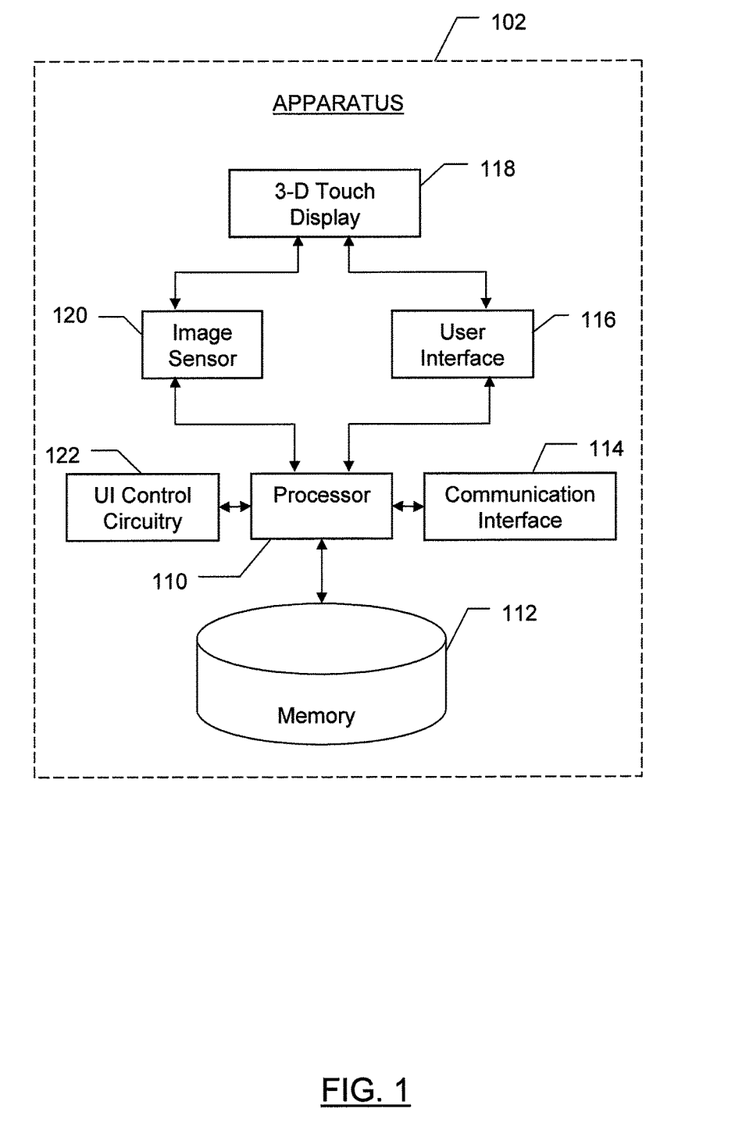
FIG. 1 illustrates a block diagram of an apparatus for facilitating interaction with a three-dimensional user interface according to an example embodiment.

FIG. 1 illustrates a block diagram of an apparatus 102 for defining an active channel in a stereoscopic view according to an example embodiment. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for facilitating interaction with a three-dimensional user interface, other configurations may also be used to implement embodiments of the present invention.

The apparatus 102 may be embodied as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a touch display capable of displaying a three-dimensional graphical user interface (e.g., an autostereoscopic three-dimensional display, an assisted three-dimensional display requiring use of glasses or other assistance device by a user, or the like). In some example embodiments, the apparatus 102 is embodied as a mobile computing device, such as the mobile terminal illustrated in FIG. 2.

Figure 2:
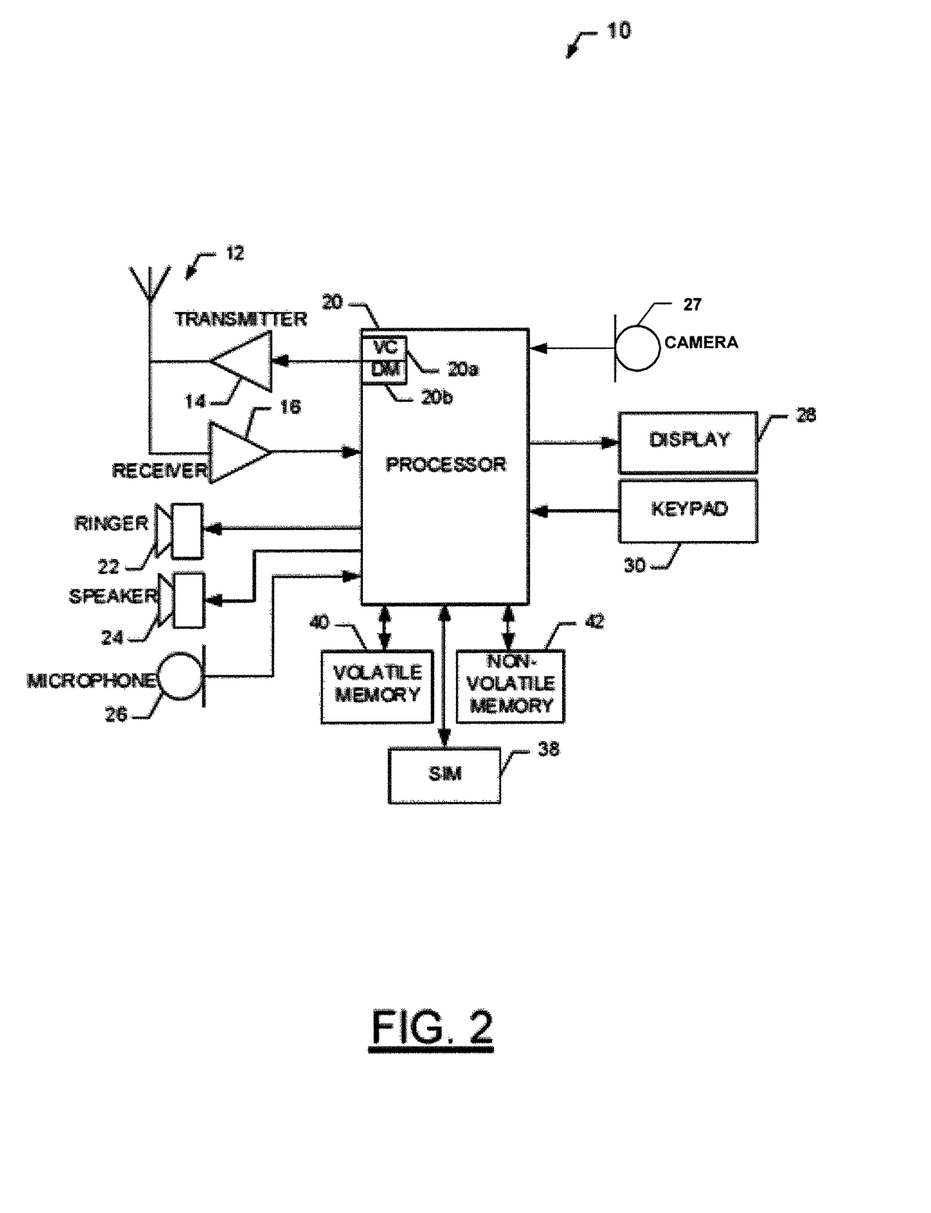
FIG. 2 is a schematic block diagram of a mobile terminal according to an example embodiment.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof.

Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a camera 27, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the camera 27, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), and/or other input device. In embodiments including a keypad, the keypad may comprise numeric (0-9) and related keys (#, *), and/or other keys for operating the mobile terminal.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, three-dimensional (3-D) touch display 118, imaging sensor 120, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, user interface 116, imaging sensor 120, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42. The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. The communication interface 114 may additionally be in communication with the memory 112, user interface 116, and/or UI control circuitry 122, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, a camera and/or other input/output mechanisms. In some example embodiments, the user interface 116 comprises or is in communication with one or more displays, such as the three-dimensional touch display 118. In some example embodiments wherein the user interface 116 comprises or is in communication with an imaging sensor 120 and a three-dimensional touch display 118, the user interface 116 may additionally be configured to detect and/or receive an indication of a touch gesture, a facial gesture, an eye movement, and/or other input to the display. The user interface 116 may be in communication with the memory 112, communication interface 114, three-dimensional touch display 118, imaging sensor 120, and/or UI control circuitry 122, such as via a bus.

In some example embodiments, the apparatus 102 comprises a three-dimensional touch display 118. In alternative example embodiments, such as in embodiments wherein the apparatus 102 is embodied as a chip or chipset, the apparatus 102 may be operatively connected with the three-dimensional touch display 118 such that the apparatus 102 may control the three-dimensional touch display 118. The three-dimensional touch display 118 may comprise any type of display capable of displaying a user interface, image, and/or the like in a manner such that it may be perceived to be displayed in three-dimensions by a user. It will be appreciated that such three-dimensional user interfaces, images, or the like that may be displayed by the three-dimensional touch display may have three or more dimensions, including, four-dimensional images or other hyper dimensional space. For example, the three-dimensional touch display 118 may comprise an autostereoscopic display capable of displaying an image in three-dimensions without necessitating the usage of 3-D glasses or the like by the user.

The imaging sensor 120 may be configured to enable the detection of an eye movement input, such as with the assistance of the user interface 116 and/or imaging sensor 120. An example eye movement input may comprise closing or opening the left eye, closing or opening the right eye, or closing or opening both eyes without making physical contact with a surface of the three-dimensional touch display 118 and/or the imaging sensor 120. In one embodiment, the imaging sensor 120 may comprise a camera, near field imaging sensor, optical sensor, infrared proximity sensor, or other image acquisition device, which may be configured to enable detection of eye movements or other facial gestures without physically contacting a display surface or the apparatus 102.

The imaging sensor 120 may be integrated into the three-dimensional touch display 118, or may be embodied separately from the three-dimensional touch display 118. In embodiments wherein the imaging sensor 120 is embodied separately from the three-dimensional touch display 118, the imaging sensor 120 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, may be embodied as or otherwise controlled by the processor 110. In some example embodiments wherein the imaging sensor 120 is embodied separately from the processor 110, the imaging sensor 120 may be in communication with the processor 110. As another example, the imaging sensor 120 may comprise one or more sensor devices, which may be integrated into the three-dimensional touch display 118, positioned near or adjacent to the three-dimensional touch display 118, and/or the like which may detect an eye movement input, or the like and generate an electrical or other signal responsive to detection of an eye movement input. For example, the imaging sensor 120 may comprise one or more cameras, one or more near field imaging sensors, one or more optical sensors, one or more infrared proximity sensors, some combination thereof, or the like, which may be configured to detect a facial gesture, an eye movement and/or other input at a position near, but not in physical contact with the three-dimensional touch display 118.

The imaging sensor 120 may be configured to generate and/or communicate a received signal indicative of an eye movement input to the processor 110, user interface 116, and/or UI control circuitry 122. As such, in some example embodiments, the UI control circuitry 122 may be configured to determine an eye movement input, an attribute of an eye movement input, and/or the like based at least in part on a signal generated by the imaging sensor 120. The imaging sensor 120 may accordingly be in communication with one or more of the memory 112, communication interface 114, user interface 116, three-dimensional touch display 118, or UI control circuitry 122, such as via a bus.

The UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, user interface 116, three-dimensional touch display 118, or image sensor 120, such as via a bus.

The UI control circuitry 122 may be configured to receive an indication of an eye movement input to the imaging sensor 120 and/or otherwise determine an eye movement input to the imaging sensor 120. In this regard, for example, the imaging sensor 120 may be configured to detect an eye movement input, or the like to the imaging sensor 120 and generate a signal indicated of the eye movement input, or the like. This signal may be received by the UI control circuitry 122, which may determine the eye movement input in response to receiving the signal. The signal may carry information indicative of a particular eye movement of the eye movement input. In this regard, the eye movement may comprise closing a right eyelid and/or closing a left eyelid. Further, the signal may carry information indicative of whether both right and left eyelids are open simultaneously. The UI control circuitry 122 may accordingly be configured to determine an eye movement input based at least in part on a received signal or other indication of an eye movement input.

The UI control circuitry 122 may be further configured to determine a relation of a an eye movement input to a three-dimensional image that may be displayed by the three-dimensional touch display 118. The three-dimensional user interface may comprise any three-dimensional image that may be displayed by the three-dimensional touch display 118. By way of non-limiting example, the three-dimensional user interface may be configured to modify attributes of any three-dimensional image that may be displayed by the three-dimensional touch display 118. In one embodiment, the three-dimensional touch display may display a three dimensional image comprising an autostereoscopic three-dimensional image, which may have a left image and a right image. However, it will be appreciated that various embodiments are not so limited and other types of three-dimensional images may be displayed. In this regard, the three-dimensional image may comprise any three-dimensional image, three-dimensional graphic(s) or object(s), some combination thereof, or the like, which may be displayed by the three-dimensional touch display 118.

In determining a relation of the position of an eye movement input to a three-dimensional user interface, the UI control circuitry 122 may be configured to determine an element of the three-dimensional image displayed. In this regard, the UI control circuitry 122 may be configured to determine positions which graphical elements of the three-dimensional user interface may be perceived by a user in three (or more)-dimensional space. Accordingly, the UI control circuitry 122 may determine the element of the three-dimensional user interface that is displayed (or would be perceived to be displayed). As another example, the UI control circuitry 122 may be configured to associate the element of the three-dimensional user interface that is displayed with a signal received from the imaging sensor 120. As an example, the UI control circuitry 122 may be configured to display a left image of an autostereoscopic three-dimensional image when a signal received from the imaging sensor 120 indicates a right eye of a user is closed. Further, the UI control circuitry 122 may be configured to display a right image of an autostereoscopic three-dimensional image when a signal received from the imaging sensor 120 indicates a left eye of a user is closed. As another example, the UI control circuitry 122 may be configured to display both images of an autostereoscopic three-dimensional image when a signal received from the imaging sensor 120 indicates both eyes of a user are open.

The UI control circuitry 122 may be further configured to cause a modification of a three-dimensional image based at least in part on the determined relation of the eye movement input and the element of the three-dimensional image. As an example, in embodiments wherein the UI control circuitry 122 is configured to display a right image of an autostereoscopic three-dimensional image, the element modified by the UI control circuitry in response to displaying the right image may comprise elements attributed only to the right image. Likewise, in other embodiments wherein the UI control circuitry 122 is configured to display a left image of an autostereoscopic three-dimensional image, the element modified by the UI control circuitry in response to displaying the right image may comprise elements attributed only to the left image. Further still, in one embodiment wherein the UI control circuitry is configured to display both images of an autostereoscopic three-dimensional image, the element modified by the UI control circuitry in response to displaying both images may comprise elements that are attributed to both the left and right images.

Figure 3:
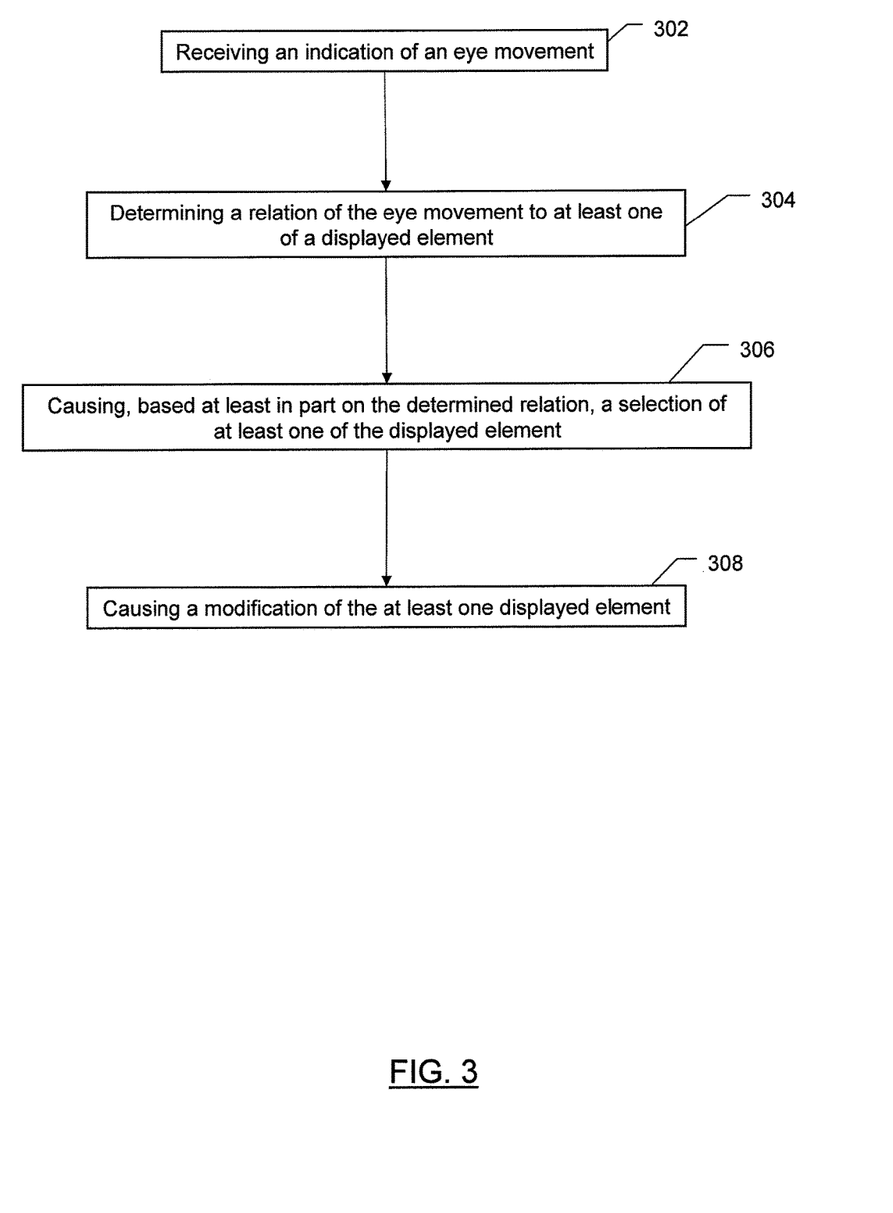
FIG. 3 illustrates a flowchart according to an example method for facilitating interaction with a three-dimensional user interface according to an example embodiment.

FIG. 3 illustrates a flowchart according to an example method for facilitating interaction with a three-dimensional user interface according to an example embodiment. The operations illustrated in and described with respect to FIG. 3 may, for example, be performed by, with the assistance of, and/or under the control of one or more of the processor 110, memory 112, communication interface 114, user interface 116, three-dimensional touch display 118, imaging sensor 120, or UI control circuitry 122. Operation 302 may comprise receiving an indication of an eye movement input to an imaging sensor 120 (e.g., a camera). The processor 110, memory 112, user interface 116, three-dimensional touch display 118, imaging sensor 120, and/or UI control circuitry 122 may, for example, provide means for performing operation 302. Operation 304 may comprise determining a relation of the eye movement input to at least one of a displayed element. The processor 110, memory 112, user interface 116, three-dimensional touch display 118, image sensor 120, and/or UI control circuitry 122 may, for example, provide means for performing operation 304. Operation 306 may comprise causing, based at least in part of the determined relation, a selection of at least one of the displayed elements displayed by the touch display. The processor 110, memory 112, user interface 116, three-dimensional touch display 118, and/or UI control circuitry 122 may, for example, provide means for performing operation 306. Operation 308 may comprise causing a modification of the at least one displayed element of the three-dimensional image. The processor 110, memory 112, user interface 116, three-dimensional touch display 118, and/or UI control circuitry 122 may, for example, provide means for performing operation 308.

Figure 4:
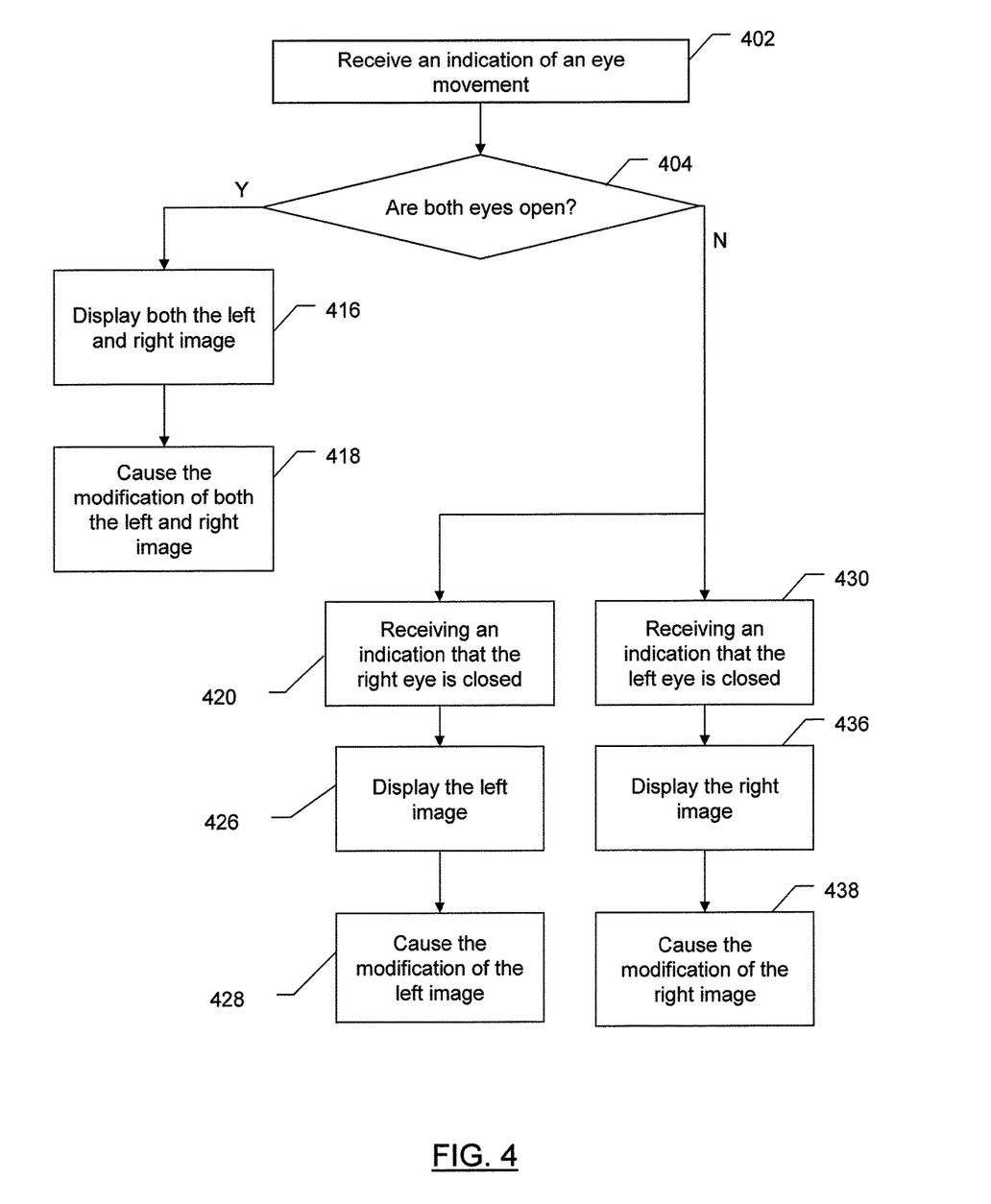
FIG. 4 illustrates a flowchart according to an example method for facilitating interaction with a three-dimensional user interface according to an example embodiment.

FIG. 4 illustrates a flowchart according to an example method for facilitating interaction with a three-dimensional image of a three-dimensional user interface according to an example embodiment. The operations illustrated in and described with respect to FIG. 4 may, for example, be performed by, with the assistance of, and/or under the control of one or more of the processor 110, memory 112, communication interface 114, user interface 116, three-dimensional touch display 118, imaging sensor 120, or UI control circuitry 122. Operation 402 may comprise receiving an indication of an eye movement. The processor 110, memory 112, user interface 116, three-dimensional touch display 118, and/or UI control circuitry 122 may, for example, provide means for performing operation 402.

Operation 404 may comprise determining if both eyes are open simultaneously. The processor 110, memory 112, user interface 116, three-dimensional touch display 118, imaging sensor 120, and/or UI control circuitry 122 may, for example, provide means for performing operation 404. Operation 416 may comprise displaying both the left image and the right image of an autostereoscopic three-dimensional image. The processor 110, memory 112, user interface 116, three-dimensional touch display 118, and/or UI control circuitry 122 may, for example, provide means for performing operation 416. Operation 418 may comprise causing a modification of both the left and right image of an autostereoscopic three-dimensional image. The processor 110, memory 112, user interface 116, three-dimensional touch display 118, imaging sensor 120, and/or UI control circuitry 122 may, for example, provide means for performing operation 418. Operation 420 may comprise receiving an indication that only the right eye is closed, while operation 430 may comprise receiving an indication that only the left is closed. The processor 110, memory 112, user interface 116, three-dimensional touch display 118, imaging sensor 120 and/or UI control circuitry 122 may, for example, provide means for performing operations 420, 430. Operation 426 may comprise displaying the left image only, and operation 428 may comprise causing the modification of the left image of an autostereoscopic three-dimensional image only. The processor 110, memory 112, user interface 116, three-dimensional touch display 118, imaging sensor 120, and/or UI control circuitry 122 may, for example, provide means for performing operation 426 and operation 428. Operation 436 may comprise displaying the right image only, and operation 438 may comprise causing the modification of the right image of an autostereoscopic three-dimensional image only. The processor 110, memory 112, user interface 116, three-dimensional touch display 118, and/or UI control circuitry 122 may, for example, provide means for performing operation 436 and operation 438.

FIGS. 3-4 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
  receiving an indication of an eye movement to an imaging sensor;
  determining that the eye movement comprises at least one of an opening or closing of at least one eye;
  determining, by a processor, a relation of the eye movement to at least one of a displayed element of a three-dimensional image;
  causing, based at least in part on the determined relation, a selection of at least one of a displayed element of the three-dimensional image; and in response to the receiving the indication of the eye movement, causing a modification of at least one attribute of the at least one selected displayed element of the three-dimensional image based on the determination of whether the at least one eye movement comprises opening or closing, wherein the at least one attribute is identified based on which of a left, right, or both eyes to which the eye movement is attributed.

2. The method of claim 1, wherein the displayed element comprises at least one of a right image and a left image of an autostereoscopic three-dimensional image.

3. The method of claim 1, wherein causing the modification of the at least one selected displayed element comprises:
- in an instance in which a left eye is closed, causing modification of the right image;
- in an instance in which a right eye is closed, causing modification of the left image; and
- in an instance in which the left eye and the right eye are open, causing modification of the right image and the left image.

4. The method of claim 1 further comprising a three-dimensional user interface, the three-dimensional user interface comprising an autostereoscopic three-dimensional image.

5. The method of claim 1, wherein causing the modification of the at least one selected displayed element comprises:
- in an instance in which the imaging sensor detects a left eye is closed, causing modification of the displayed element such that the right image is displayed and the left image is not displayed; and
- in an instance in which the imaging sensor detects a right eye is closed, causing modification of the displayed element such that the left image is displayed and the right image is not displayed.

6. An apparatus comprising at least one processor and at least one memory storing computer program code, wherein the at least one memory and stored computer program code are configured, with the at least one processor, to cause the apparatus to at least:
- receive an indication of an eye movement to an imaging sensor;
- determine that the eye movement comprises at least one of an opening or closing of at least one eye;
- determine a relation of the eye movement to at least one of a displayed element of a three-dimensional image;
- cause, based at least in part on the determined relation, a selection of at least one of a displayed element of the three-dimensional image; and
- in response to the receiving the indication of the eye movement, cause a modification of at least one attribute of the at least one selected displayed element of the three-dimensional image based on the determination of whether the at least one eye movement comprises opening or closing, wherein the at least one attribute is identified based on which of a left, right, or both eyes to which the eye movement is attributed to.

7. The apparatus of claim 6, wherein the at least one memory and stored computer program code are configured, with the at least one processor, to cause the apparatus to display a stereoscopic image comprising a left image and a right image.

8. The apparatus of claim 6, wherein causing the modification of the at least one selected displayed element comprises:
- in an instance in which a left eye is closed, cause modification of the right image;
- in an instance in which a right eye is closed, cause modification of the left image; and
- in an instance in which the left eye and the right eye are open, cause modification of the right image and the left image.

9. The apparatus of claim 6 further comprising a three-dimensional user interface, the three-dimensional user interface comprising an autostereoscopic three-dimensional image.

10. The apparatus of claim 6, wherein causing the modification of the at least one selected displayed element comprises:
- in an instance in which the imaging sensor detects a left eye is closed, causing modification of the displayed element such that the right image is displayed and the left image is not displayed; and
- in an instance in which the imaging sensor detects a right eye is closed, causing modification of the displayed element such that the left image is displayed and the right image is not displayed.

11. A computer program product comprising at least one non-transitory computer-readable storage medium having computer-readable program instructions stored therein, the computer-readable program instructions comprising program instructions configured to cause an apparatus to perform a method comprising:
- receiving an indication of an eye movement to an imaging sensor;
- determining that the eye movement comprises at least one of an opening or closing of at least one eye;
- determining a relation of the eye movement to at least one of a displayed element of a three-dimensional image;
- causing, based at least in part on the determined relation, a selection of at least one of a displayed element of the three-dimensional image; and
- in response to the receiving the indication of the eye movement, causing a modification of at least one attribute of the at least one selected displayed element of the three-image based on the determination of whether the at least one eye movement comprises opening or closing, wherein the at least one attribute is identified based on which of a left, right, or both eyes to which the eye movement is attributed.

12. The computer program product of claim 11, wherein the displayed element comprises at least one of a left image and a right image of an autostereoscopic three-dimensional image.

13. The computer program product of claim 11, wherein causing the modification of the at least one selected displayed element comprises:
- in an instance in which a left eye is closed, causing modification of the right image;
- in an instance in which a right eye is closed, causing modification of the left image; and
- in an instance in which the left eye and the right eye are open, causing modification of the right image and the left image.

14. The computer program product of claim 11 further comprising a three-dimensional user interface, the three-dimensional user interface comprising an autostereoscopic three-dimensional image.

15. The computer program product of claim 11, wherein causing the modification of the at least one selected displayed element comprises:

in an instance in which the imaging sensor detects a left eye is closed, causing modification of the displayed element such that the right image is displayed and the left image is not displayed; and in an instance in which the imaging sensor detects a right eye is closed, causing modification of the displayed element such that the left image is displayed and the right image is not displayed.

\* \* \* \* \*

UNITED STATES PATENT AND TRADEMARK OFFICE
CERTIFICATE OF CORRECTION

| | | |
|---|---|---|
| PATENT NO. | : 9,766,698 B2 | Page 1 of 1 |
| APPLICATION NO. | : 13/101297 | |
| DATED | : September 19, 2017 | |
| INVENTOR(S) | : Huhtala et al. | |

It is certified that error appears in the above-identified patent and that said Letters Patent is hereby corrected as shown below:

In the Claims

<u>Column 15,</u>
Line 59, "attributed to." should read --attributed.--.

Signed and Sealed this
Twelfth Day of June, 2018

Andrei Iancu
*Director of the United States Patent and Trademark Office*